United States Patent
Vargo, Jr. et al.

(10) Patent No.: US 7,264,053 B2
(45) Date of Patent: Sep. 4, 2007

(54) METHODS OF USING WELLBORE SERVICING FLUIDS COMPRISING RESILIENT MATERIAL

(75) Inventors: Richard F. Vargo, Jr., Katy, TX (US); Mark R. Savery, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 164 days.

(21) Appl. No.: 11/089,267

(22) Filed: Mar. 24, 2005

(65) Prior Publication Data

US 2006/0213663 A1    Sep. 28, 2006

(51) Int. Cl.
E21B 33/13    (2006.01)

(52) U.S. Cl. ............. 166/292; 166/305.1; 166/309

(58) Field of Classification Search ............... None
See application file for complete search history.

(56) References Cited

U.S. PATENT DOCUMENTS

| | | | |
|---|---|---|---|
| 2,944,018 A | 7/1960 | Borcherdt | |
| 4,083,407 A | 4/1978 | Griffin et al. | |
| 4,217,965 A | 8/1980 | Cremeans | |
| 4,304,298 A | 12/1981 | Sutton | |
| 4,340,427 A | 7/1982 | Sutton | |
| 4,367,093 A | 1/1983 | Burkhalter et al. | |
| 4,391,643 A | 7/1983 | Murphey | |
| 4,428,844 A | 1/1984 | Wagener | |
| 4,450,010 A | 5/1984 | Burkhalter et al. | |
| 4,530,402 A * | 7/1985 | Smith et al. ........... | 166/291 |
| 4,531,594 A | 7/1985 | Cowan | |
| 4,565,578 A | 1/1986 | Sutton et al. | |
| 4,588,032 A | 5/1986 | Weigand et al. | |
| 4,836,940 A | 6/1989 | Alexander | |
| 5,293,938 A | 3/1994 | Onan et al. | |
| 5,458,195 A | 10/1995 | Totten et al. | |
| 5,501,277 A | 3/1996 | Onan et al. | |
| 5,569,324 A | 10/1996 | Totten et al. | |
| 5,572,021 A | 11/1996 | Heathman et al. | |
| 5,716,910 A | 2/1998 | Totten et al. | |
| 5,718,292 A | 2/1998 | Heathman et al. | |
| 5,779,787 A * | 7/1998 | Brothers et al. ........... | 106/802 |
| 5,789,352 A | 8/1998 | Carpenter et al. | |
| 5,826,669 A * | 10/1998 | Zaleski et al. ........... | 175/72 |

(Continued)

FOREIGN PATENT DOCUMENTS

WO    WO 01/53429 A1    7/2001

(Continued)

OTHER PUBLICATIONS

Halliburton brochure entitled "Dual Spacer System" dated 1999.

(Continued)

Primary Examiner—Zakiya Bates
Assistant Examiner—Angela DiTrani
(74) Attorney, Agent, or Firm—Craig W. Roddy; Conley Rose

(57) ABSTRACT

A method of servicing a wellbore, comprising providing a wellbore fluid comprising a carrier fluid and a resilient material, and introducing the wellbore fluid to an annulus, wherein at least a portion of the resilient material reduces in volume to affect the annular pressure.

19 Claims, 4 Drawing Sheets

U.S. PATENT DOCUMENTS

| | | |
|---|---|---|
| 5,851,960 A | 12/1998 | Totten et al. |
| 5,945,387 A | 8/1999 | Chatterji et al. |
| 6,152,227 A | 11/2000 | Lawson et al. |
| 6,220,354 B1 | 4/2001 | Chatterji et al. |
| 6,308,777 B2 | 10/2001 | Chatterji et al. |
| 6,500,252 B1 | 12/2002 | Chatterji et al. |
| 6,508,305 B1 | 1/2003 | Brannon et al. |
| 6,518,224 B2 | 2/2003 | Wood |
| 6,630,429 B1 | 10/2003 | Cremeans et al. |
| 6,645,288 B1 | 11/2003 | Dargaud et al. |
| 6,703,351 B2 * | 3/2004 | Stowe et al. ................ 507/117 |
| 6,715,553 B2 | 4/2004 | Reddy et al. |
| 6,722,434 B2 | 4/2004 | Reddy et al. |
| 6,729,405 B2 | 5/2004 | DiLullo et al. |
| 6,742,591 B2 | 6/2004 | Le Roy-Delage et al. |
| 6,806,232 B1 | 10/2004 | Cart |
| 6,852,676 B1 | 2/2005 | Chatterji et al. |
| 2003/0132000 A1 | 7/2003 | Shaarpour |
| 2003/0186819 A1 | 10/2003 | Shaarpour |
| 2004/0058825 A1 | 3/2004 | Rayborn |
| 2004/0058826 A1 | 3/2004 | Rayborn |
| 2004/0118561 A1 | 6/2004 | Heathman et al. |
| 2004/0123985 A1 | 7/2004 | Whitfill et al. |
| 2004/0127368 A1 | 7/2004 | Rayborn |
| 2004/0132625 A1 * | 7/2004 | Halliday et al. ............ 507/100 |
| 2004/0138067 A1 | 7/2004 | Rayborn |
| 2004/0144537 A1 | 7/2004 | Reddy et al. |
| 2004/0163812 A1 | 8/2004 | Brothers |
| 2004/0171499 A1 * | 9/2004 | Ravi et al. ................. 507/200 |
| 2004/0204323 A1 | 10/2004 | Temple et al. |
| 2004/0224852 A1 | 11/2004 | Halliday et al. |

FOREIGN PATENT DOCUMENTS

| | | |
|---|---|---|
| WO | WO 2004/037947 | 5/2004 |

OTHER PUBLICATIONS

Halliburton brochure entitled "Econolite Additive For Cement Slurries" Dated 1998.

Halliburton brochure entitled "Flo-Chek™ Service Lost-Circulation Service" dated 2000.

Halliburton brochure entitled "Mud Flush Aqueous Solution" dated 1999.

Baroid brochure entitled " STEELSEAL™ Lost Circulation Material" dated 2004.

Halliburton brochure entitled "STEELSEAL™ Designed for Lost Circulation Prevention in Water-Based, Synthetic and Oil-Based Drilling Fluids in Porous and Fractured Zones" dated 2001.

Baroid brochure entitled "STEELSEAL™ Fine Lost Circulation Material" Dated 2004.

Halliburton brochure entitled "STEELSEAL™ Fine High Performance Lost Circulation Material, Designed to Control Seepage Losses In Depleted Sands" dated 2001.

Halliburton brochure entitled "Super CBL Additive Cement Additive" Dated 1999.

Halliburton brochure entitled "Super Flush Spacer" dated 1999.

Halliburton brochure entitled "Tuned$^{sm}$ Displacement Service Helps Achieve Optimum Displacement of Fluid Rheologies Based on Fluid Shear (tau) Relationships" dated 2004.

Paper entitled "Multi-functional solid lubricant reduces friction/prevents mud loss" dated 1998.

Paper entitled "Wellbore Stability Software", by Dennis Denney, Technology Applications, dated 2002.

Foreign communication from a related counterpart application dated Aug. 14, 2006.

Ahmad, Maf, entitled "Flexible Vinyl Resiliency Property Enhancement With Hollow Thermoplastic Microspheres" Journal of Vinyl and Additive Technology, Sep. 2001.

Forsythe, W.E., Smithsonian Physical Tables, 9th rev. ed. 2003.

U.S. Appl. No. 11/089,398, filed Jul. 6, 2006.

U.S. Appl. No. 11/089,398, filed Dec. 12, 2006.

* cited by examiner

TEMPERATURE INDUCED PRESSURE RESPONSES FOR THE BASE FLUIDS ONLY (NO STEELSEAL).

FIG. 4

EVALUATION OF STEELSEAL FOR REDUCING ANNUAL PRESSURE BUILDUP.
*INITIAL RAMP-UP WAS 15 MINUTES, RAMP DOWN WAS 15 MINUTES.
**INITIAL RAMP-UP WAS 130 MINUTES, RAMP DOWN WAS 55 MINUTES.

| EVALUATION OF MATERIALS FOR REDUCING ANNULAR PRESSURE BUILDUP | | | | | PRESSURE MITIGATION IMPROVEMENT | |
|---|---|---|---|---|---|---|
| TEST MATERIAL | 1ST PRESSURE RAMP (psi/°F) | DIFFERENTIAL FOR 1ST RAMP | 2ND PRESSURE RAMP (psi/°F) | DIFFERENTIAL FOR 2ND RAMP | AFTER 1ST RAMP | AFTER 2ND RAMP |
| SPACER | 81.0 | - | - | - | - | - |
| DRILLING FLUID | 75.6 | - | - | - | - | - |
| WATER | 75.2 | - | - | - | - | - |
| 10% STEELSEAL | 61.9 | 6191 | 71.9 | 5376 | 24.7% | 43.6% |
| 22% STEELSEAL (SHORT PLACEMENT TIME*) | 47.8 | 4784 | 63.7 | 4290 | 61.3% | 79.9% |
| 26% STEELSEAL | 53.7 | 5369 | 64.4 | 5347 | 43.8% | 44.4% |
| 40% STEELSEAL | 57.8 | 5780 | 60.4 | 5476 | 33.5% | 41.0% |
| 22% STEELSEAL (EXTENDED PLACEMENT TIME**) | 50.1 | 5013 | 61.1 | 4967 | 54.0% | 55.4% |

METHODS OF USING WELLBORE SERVICING FLUIDS COMPRISING RESILIENT MATERIAL

CROSS REFERENCE TO RELATED APPLICATIONS

A related co-pending application is U.S. patent application Ser. No. 10/791,151 filed on Mar. 2, 2004 and entitled "Improved Well Fluids and Methods of Use in Subterranean Formations," which is incorporated by reference herein in its entirety.

BACKGROUND OF THE INVENTION

1. Field of the Invention

This invention relates to the field of wellbore fluids and more specifically to the field of wellbore fluids comprising a resilient material as well as methods for using such wellbore fluids to service a wellbore.

2. Background of the Invention

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Secondary cementing operations may also be performed after the primary cementing operation. One example of a secondary cementing operation is squeeze cementing whereby a cement slurry is forced under pressure to areas of lost integrity in the annulus to seal off those areas.

After completion of the cementing operations, production of the oil or gas may commence. The oil and gas are produced at the surface after flowing through the wellbore. As the oil and gas pass through the wellbore, heat may be passed from such fluids through the casing and into the annular space, which typically results in expansion of any fluids in the annular space. Such an expansion may cause an increase in pressure within the annular space, which is known as annular pressure buildup. Annular pressure buildup typically occurs when the annular volume is fixed. For instance, the annular space may be closed (e.g., trapped). The annular space is trapped to isolate fluids within the annulus from areas outside the annulus. Trapping of an annular space typically occurs near the end of cementing operations after well completion fluids such as spacer fluids and cements are in place. The annular space is conventionally trapped by closing a valve, energizing a seal, and the like. Trapping presents operational problems. For instance, annular pressure buildup may cause damage to the wellbore such as damage to the cement sheath, the casing, tubulars, and other equipment.

To prevent such damage by annular pressure buildup, pressure relieving/reducing methods have been developed such as using syntactic foam wrapping on the casing, placing nitrified spacer fluids above the cement in the annulus, placing rupture disks in an outer casing string, designing "shortfalls" in the primary cementing operations such as designing the top of the cement column in an annulus to be short of the previous casing shoe, using hollow spheres, and others. However, such methods have drawbacks. For instance, the syntactic foam may cause flow restrictions during primary cementing of the casing within the wellbore. In addition, the syntactic foam may detach from the casing and/or become damaged as the casing is installed. Drawbacks with placing the nitrified spacer fluids include logistical difficulties (e.g., limited room for the accompanying surface equipment), pressure limitations on the wellbore, and the typical high expenses related thereto. Further drawbacks with placing the nitrified spacer fluids include loss of returns when circulating the nitrified spacer into place and in situations wherein the geographic conditions provide difficulties in supplying the proper equipment for pumping the nitrified spacer. Additional drawbacks include the rupture disks so comprising the casing string after failure of the disks that continuing wellbore operations may not be able to proceed. Further drawbacks include the designed "shortfall," which may not occur due to wellbore fluids not being displaced as designed and cement channeling up to a casing shoe and trapping it. Moreover, problems with the hollow spheres include the spheres failing before placement in the annulus.

Consequently, there is a need for reducing annular pressure buildup. In addition, there is a need for an improved manner for addressing the problems of annular pressure buildup.

BRIEF SUMMARY OF SOME OF THE PREFERRED EMBODIMENTS

These and other needs in the art are addressed in one embodiment by a method of affecting annular pressure buildup in an annulus of a wellbore. The method comprises providing a wellbore fluid comprising a carrier fluid and a resilient material. In addition, the method comprises introducing the wellbore fluid to the annulus, wherein at least a portion of the resilient material reduces in volume to affect the annular pressure.

In another embodiment, needs in the art are addressed by a method of servicing a wellbore that is comprised of a wellbore fluid, a carrier fluid and a resilient material. In addition, the method comprises introducing the wellbore fluid to an annulus and allowing at least a portion of the wellbore fluid to become trapped in the annulus. The method further comprises displacing a cement composition into the annulus and allowing the cement composition to set. The method further comprises alleviating the annular pressure buildup above the set cement composition by means of harnessing the resilient nature of the material in the trapped wellbore fluid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily used as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 4 shows the effects of fluids containing different amounts of STEELSEAL on annular pressure buildup.

DETAILED DESCRIPTION OF THE PREFERRED EMBODIMENTS

Figure 1:
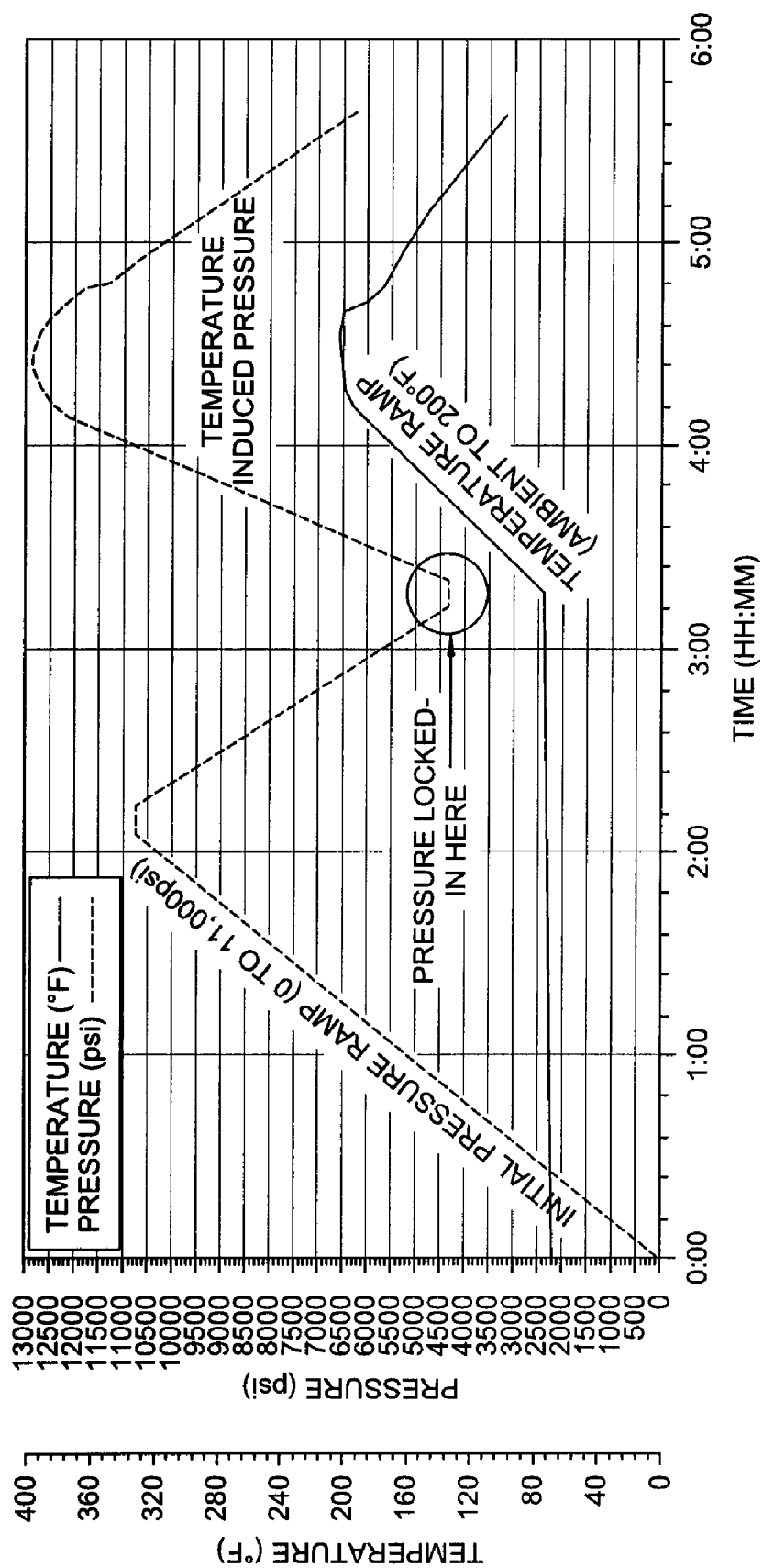
FIG. 1 illustrates a test schedule simulating well conditions.

In an embodiment, a wellbore fluid comprises a resilient material and a carrier fluid. The wellbore fluid may be used in a wellbore that penetrates a subterranean formation. It is to be understood that "subterranean formation" encompasses both areas below exposed earth and areas below earth covered by water such as ocean or fresh water. The wellbore fluid may be any fluid that is intended to become trapped within an annulus in a subterranean formation during cementing operations. Without limitation, examples of suitable wellbore fluids include a drilling fluid, a spacer fluid, a completion fluid, and the like. Wellbore servicing operations using the wellbore fluid are discussed later in this application.

The wellbore fluid comprises resilient materials that are able to reduce in volume when exposed to a compressive force and are also able to return back to about their normal volume (e.g., pre-compressive force volume) when the compressive force subsides. In an embodiment, the resilient material returns to about the normal volume (e.g., to about 100% of the normal volume) when the compressive force subsides. In an alternative embodiment, the resilient material returns to a high percentage of the normal volume when the compressive force subsides. A high percentage refers to a portion of the normal volume that may be from about 70% to about 99% of the normal volume, alternatively from about 70% to about 85% of the normal volume, and further alternatively from about 85% to about 99% of the normal volume. For instance, a compressive force generated by expansion of another fluid within a trapped annulus may provide such a force. In some embodiments, hydrocarbon production in a wellbore may cause an increase in the annular temperature of the trapped annulus thus expanding the annular fluid and providing the force. Without being limited by theory, it is believed that the reduction in volume of the resilient materials caused by the compressive force may provide an amount of expansion volume in the annulus. By providing an amount of expansion volume, it is believed that the pressure within the annulus may be affected (e.g., reduced or maintained at about a constant pressure).

Without limitation, examples of suitable resilient materials include natural rubber, elastomeric materials, styrofoam beads, graphite, polymeric beads, and combinations thereof. Natural rubber includes rubber and/or latex materials derived from a plant. Elastomeric materials include thermoplastic polymers that have expansion and contraction properties from heat variances. Examples of suitable elastomeric materials include without limitation a styrene-butadiene copolymer, neoprene, synthetic rubbers, vinyl plastisol thermoplastics, and combinations thereof. Without limitation, examples of suitable synthetic rubbers include nitrile rubber, butyl rubber, polysulfide rubber, EPDM rubber, silicone rubber, polyurethane rubber, and combinations thereof. In some embodiments, the synthetic rubber comprises rubber particles from processed rubber tires (e.g., car tires, truck tires, and the like). The rubber particles may be of any suitable size for use in a wellbore fluid. In an embodiment, the rubber particles are of a size from about 10 microns to about 20 microns. Without limitation, processing the rubber tires may include mechanically removing metal such as steel surrounding the inner core of the tire and thereafter shredding and grinding the tire into the desired particle size.

Examples of commercial graphites include without limitation STEELSEAL and STEELSEAL FINE available from Baroid Fluids, a Halliburton company. STEELSEAL and STEELSEAL FINE are resilient, dual composition graphite derivatives. In some embodiments, the wellbore fluid comprises STEELSEAL, STEELSEAL FINE, or combinations thereof.

Graphite has a laminar structure. Without being limited by theory, it is believed that the layers in such a laminar structure provide the graphite with the ability to reduce in volume upon exposure to a compressive force and thereby provide expansion volume in the annulus. For instance, as the compressive force is applied and increased, the layers become correspondingly closer together, which may result in a reduction in volume of the graphite. Upon alleviating such an applied compressive force, the layers may spread apart, which may result in an increase in volume of the graphite. In some embodiments, the graphite may return to about the volume it occupied before exposure to the compressive force.

The wellbore fluid comprises from about 1 to about 50 vol. %, alternatively from about 10 to about 40 vol. % resilient material, further alternatively from about 20 to about 30 vol. % resilient material, and alternatively from about 22 to about 26 vol. % resilient material.

The carrier fluid comprises an aqueous-based fluid or a nonaqueous-based fluid. Without limitation, examples of suitable aqueous-based fluids comprise fresh water, salt water (e.g., water containing one or more salts dissolved therein), brine (e.g., saturated salt water), seawater, water-based drilling fluids (e.g., water-based drilling fluid comprising additives such as clay additives), and combinations thereof. Examples of suitable nonaqueous-based fluids include without limitation diesel, crude oil, kerosene, aromatic mineral oils, non-aromatic mineral oils, linear alpha olefins, poly alpha olefins, internal or isomerized olefins, linear alpha benzene, esters, ethers, linear paraffins, and combinations thereof. For instance, the non-aqueous-based fluids may be blends such as internal olefin and ester blends. In some embodiments, the carrier fluid may be present in the wellbore fluid in an amount sufficient to form a pumpable wellbore fluid. In other embodiments, the wellbore fluid comprises from about 10 to about 90 vol. % carrier fluid.

In some embodiments, the wellbore fluid may comprise additives such as tracers, gas-generating additives, displacement facilitators, or combinations thereof. Suitable tracers include those that may indicate placement of the wellbore fluid at a desired location in the wellbore. Examples of suitable tracers include without limitation fluorescein dyes, tracer beads, and combinations thereof. In some embodiments, the tracer may not be included in the wellbore fluid but instead may be introduced into the wellbore ahead of the wellbore fluid. In such embodiments, the amount of tracer introduced to the wellbore ahead of the wellbore fluid may be from about 10 to about 200 barrels. It is to be understood that the amount of tracer introduced ahead of the wellbore fluid is not limited to such range but may vary according to factors such as the length and cross-sectional area of the wellbore. In some embodiments, by introducing the tracers ahead of the wellbore fluid, the tracers may indicate that the wellbore fluids have arrived at a desired location in the wellbore.

In other embodiments, the wellbore fluid may be foamed by a gas-generating additive. For instance, the gas-generating additive may generate a gas in situ at a desired time. Without being limited by theory, the gas-generating additive may further reduce annular pressure buildup by compression of the gas generated by the gas-generating additive. Examples of suitable gas-generating additives include without limitation azodicarbonamide, aluminum powder, and combinations thereof. The azodicarbonamide may generate nitrogen gas. The aluminum powder may produce hydrogen gas. As an example, the reaction by which the aluminum powder generates the hydrogen gas may proceed according to the following reaction:

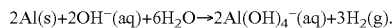

$$2Al(s)+2OH^-(aq)+6H_2O \rightarrow 2Al(OH)_4^-(aq)+3H_2(g).$$

SUPER CBL, which is available from Halliburton Energy Services, Inc., is a commercial example of an aluminum powder that is a gas-generating additive. In addition, SUPER CBL may be available as a dry powder or a liquid additive. The gas-generating additive may be added to the wellbore fluid in any suitable way. For instance, the gas-generating additive may be added to the wellbore fluid by dry blending it with the resilient materials or by injection into the wellbore fluid as a liquid suspension while the wellbore fluid is being pumped into the subterranean formation. In some embodiments, the wellbore fluid may comprise from about 0.2 to about 5 vol. % gas-generating additive. In other embodiments, the wellbore fluid may comprise from about 0.25 to about 3.8 vol. % gas-generating additive.

In other embodiments, the wellbore fluid further includes a displacement facilitator, which may be suitable to facilitate displacement of a drilling mud from the wellbore. Examples of suitable displacement facilitators include a silicate, a metasilicate, an acid pyrophosphate, a silicon dioxide, and combinations thereof. Without limitation, examples of suitable silicates include sodium silicate, potassium silicate, metasilicates, and combinations thereof. FLO-CHEK and SUPER FLUSH from Halliburton Energy Services, Inc. are commercial examples of available sodium and potassium silicates. In some embodiments, the wellbore fluid comprises from about 2 to about 12 wt. % silicates. Examples of suitable metasilicates include without limitation sodium metasilicate, potassium metasilicate, and combinations thereof. Examples of metasilicates include ECONOLITE, which is commercially available from Halliburton Energy Services, Inc. In other embodiments, the wellbore fluid comprises from about 2 to about 12 wt. % metasilicates. Examples of suitable acid pyrophosphates include without limitation sodium acid pyrophosphates. A commercial example of an available sodium acid pyrophosphate is MUD FLUSH from Halliburton Energy Services, Inc. In some embodiments, the wellbore fluid comprises from about 1 to about 5 wt. % acid pyrophosphates. Examples of silicon dioxides include without limitation diatomaceous earth, silica fume, bentonite, and crystalline silica. Commercial examples of displacement facilitators with silicon dioxides as the base include DUAL SPACER, TUNED SPACER, TUNED SPACER E+, and SD Spacer, which are all available from Halliburton Energy Services, Inc. In other embodiments, the wellbore fluid comprises from about 0.01 to about 90 wt. % silicon dioxide, with the preferred embodiment being 1 to 10 wt. % silicon dioxide.

In other embodiments, the wellbore fluid may also contain additional additives suitable for use with drilling fluids, spacer fluids, and completion fluids. Examples of such additional additives include, without limitation, fluid loss control agents, weighting agents, viscosifiers, oxidizers, surfactants, dispersants, suspending agents, pH increasing materials, pH decreasing materials, lost circulation materials (LCMs), gelling agents, and combinations thereof. In an embodiment, the wellbore fluid contains a suspending agent to improve homogeneity of the resilient materials amid the carrier fluid. Without limitation, an example of a suitable suspending agent is xanthan gum, which is a polysaccharide. A commercial example of a suspending agent is BARA-ZAN, which is available from Halliburton Energy Services, Inc.

The wellbore fluid of the present invention may be used in various wellbore servicing operations. For instance, the wellbore fluid may be a spacer fluid, a drilling mud, or a completion fluid such as cement.

In one embodiment, the wellbore fluid is a spacer fluid. The wellbore fluid may be placed in an annulus of a wellbore in any suitable manner. In an embodiment, the wellbore fluid may be placed into the annulus directly from the surface. In another embodiment, the wellbore fluid may be placed into the annulus by flowing through the casing into place in the annulus between the casing and the subterranean formation. Additional fluids such as cements may be circulated into place behind the wellbore fluids. The wellbore fluids may become trapped within the annulus in front of such additional fluids. After being trapped, at least a portion of the resilient materials may be exposed to a compressive force and thereby reduce in volume in the annulus, which may affect the annulus pressure. For instance, if the annulus temperature increases after hydrocarbon production from the formation begins, at least a portion of the resilient materials may reduce in volume to mitigate or prevent annular pressure buildup.

In another embodiment, the wellbore fluid may be employed in a primary cementing operation. In such an embodiment, the wellbore fluid may be a spacer fluid. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving the annulus between the wall of the conduit and the wall of the wellbore. The drilling fluid may then be displaced down through the conduit and up through the annulus one or more times, for example, twice, to clean out the hole. The wellbore fluid may then be placed in the annulus with at least a portion of the wellbore fluid becoming trapped in the annulus. In some embodiments, the wellbore fluid may displace the drilling fluid from the wellbore. The cement composition may then be conveyed downhole and up through the annulus to the trapped wellbore fluid. The cement composition may set into a hard mass, which may form a cement column that isolates an adjacent portion of the subterranean formation and provides support to the adjacent conduit. In alternative embodiments, the wellbore fluid may become trapped in the annulus after a cement composition is placed in the annulus. In other alternative embodiments, the wellbore fluid is a drilling fluid. In such other alternative embodiments, the wellbore fluid may be used as a carrier for the product, which may be used to prevent the pressure increase. The product can be added to the wellbore fluid instead of a cement spacer. In some instances, a wellbore may have a large volume that is uneconomical to use a cement spacer. In such instances, a wellbore fluid may be used as a carrier for any pressure reduction materials.

To further illustrate various illustrative embodiments of the present invention, the following example is provided.

EXAMPLE

In the Example, the ability of STEELSEAL to mitigate temperature induced annular pressure buildup (APB) and prevent casing failure was observed. Five different formulations of STEELSEAL were added to spacer plus drilling fluid systems, which simulated trapped annular fluids and their associated volumes as they relate to an actual wellbore, and were tested under the simulation of temperature-induced APB (Tests 1-5). In addition, deepwater well conditions and placement mechanisms were simulated during each test to ensure accuracy. A Modified Ultrasonic Cement Analyzer (MUCA) from Chandler Engineering was used. In operating the MUCA, the pressure can be locked-in during a test, and the MUCA can monitor pressure variances generated by other mechanisms apart from the machine itself (e.g., temperature induced). In addition, a test schedule was created prior to each test to simulate the job placement schedule of the lead fluid system with STEELSEAL and the temperature cycles associated with producing the well. The test schedule was then entered into a Chandler 5270 data acquisition and control system. FIG. 1 was the starting point in the development of all test schedules and illustrates the MUCA test schedule for simulating actual well conditions. Each test schedule began with an initial job placement ramp from 0 to 11,000 psi for 130 minutes. The pressure was then relieved for 55 minutes to 4,420 psi, which is a possible pressure that exists at the sub-sea well hanger. A ramp to 200° F. for 60 minutes was then initiated, which simulated a temperature increase during production. The pressure response was then recorded. A dwell for 30 minutes at 200° F. then occurred, and the test cell was then cooled back to ambient temperature.

Figure 2:
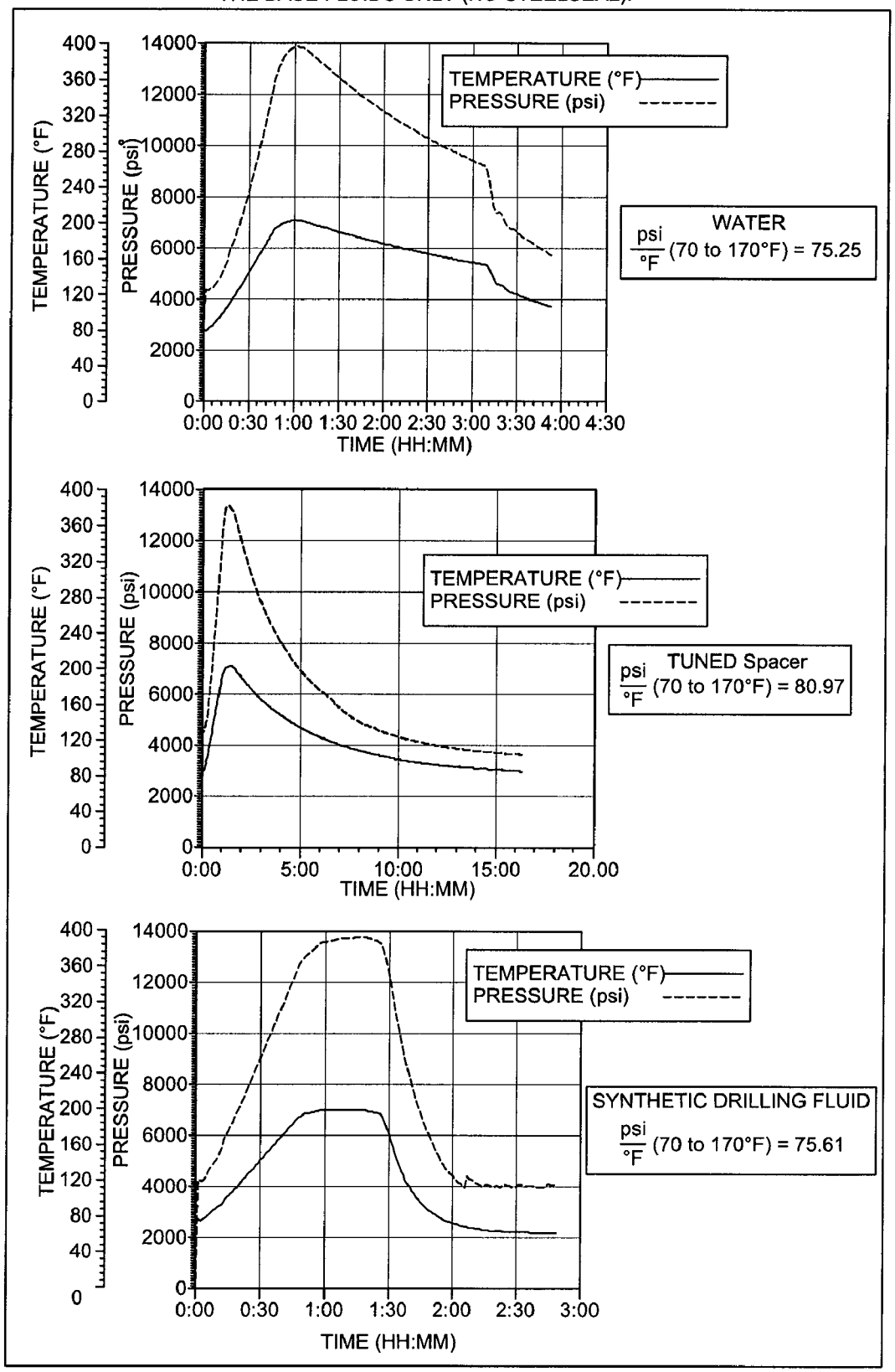
FIG. 2 illustrates temperature induced pressure responses of various fluids.

To determine the pressure responses of STEELSEAL plus annular fluid systems, the baseline pressure responses were determined for 1) water, 2) the base spacer, and 3) the base drilling fluid. FIG. 2 shows these responses, without STEELSEAL, for a temperature ramp from 75° F. to 200° F. starting at 4,420 psi, which is the pressure the trapped annular fluids may be exposed to during production. The average of the three [psi/°F.] values between 70° F. and 170° F. (differential of 100° F.) in FIG. 2 was used as a baseline when comparing the [psi/°F.] values of systems containing STEELSEAL. To determine these responses illustrated in FIG. 2, five test schedules similar to the test schedule of FIG. 1 were run with STEELSEAL at different compositions. Each sample volume prepared for each of the five tests was 500 cc, which included the drilling fluid, spacer (TUNED SPACER), and STEELSEAL. The formulations are noted in volume % as follows:

Test 1—10% STEELSEAL, 70% TUNED SPACER (13.3 ppb), 20% synthetic oil based mud (SOBM) (13.9 ppb);
Test 2—22% STEELSEAL, 68% TUNED SPACER (13.3 ppb), 10% SOBM (13.9 ppb);
Test 3—22% STEELSEAL, 78% TUNED SPACER (12.2 ppb);
Test 4—26% STEELSEAL, 74% TUNED SPACER (12.5 ppb); and
Test 5—40% STEELSEAL, 60% TUNED SPACER (12.5 ppb).

The testing procedure was as follows:
1. Weighed up TUNED SPACER and mixed;
2. Added STEELSEAL to spacer and mixed;
3. Added drilling fluid (if any) and mixed until uniform;
4. Poured mixture into test cell and placed cell into the MUCA;
5. Input test schedule on Chandler control screen and started test; and
6. Locked-in pressure after initial pressure ramp (if applicable).

After each test, the pressure response plot from Chandler 5270 data acquisition was used to find [psi/°F.] values for each temperature cycle. These [psi/°F.] values, based on the differential pressures resulting from each ramp, were compared to the baseline average in FIG. 2 to determine the effects of STEELSEAL in mitigating pressure.

Figure 3:
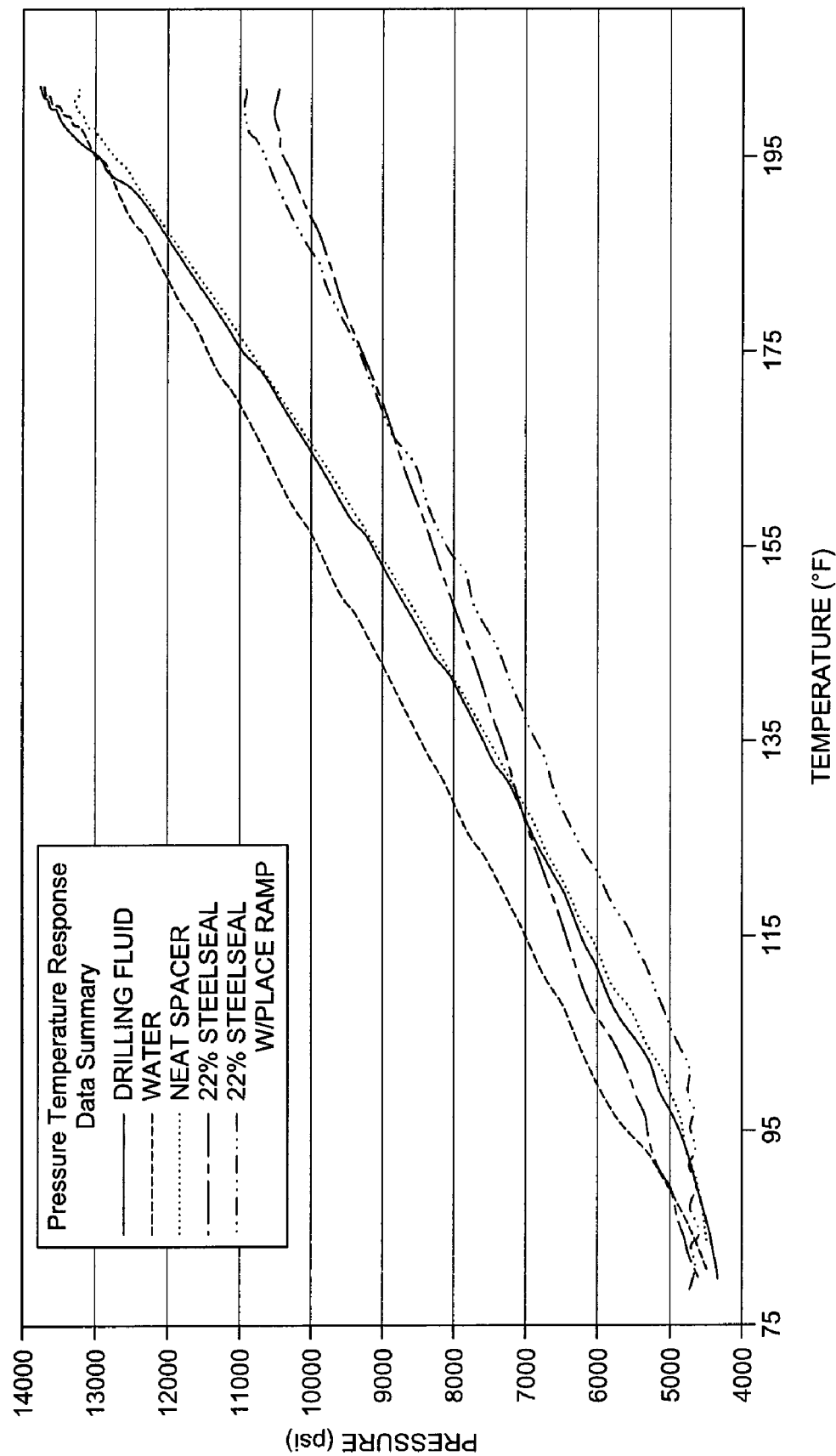
FIG. 3 illustrates pressure-temperature response data for fluids containing STEELSEAL.

The results of tests 2 and 3 are illustrated in FIG. 3, and the results of all five tests are shown in FIG. 4. It can be seen from FIG. 3 that the two samples with 22 volume % STEELSEAL provided for less pressure buildup than the comparative examples with only water, only drilling fluid, and only spacer fluid. In addition, FIG. 4 shows that the sample with 22 volume % STEELSEAL had less pressure buildup than the sample with 10 volume % STEELSEAL and 40 volume % STEELSEAL, which suggests that under some conditions 22 volume % may be an optimal amount of STEELSEAL. The results show that wellbore fluids having STEELSEAL mitigated pressure buildup in an annulus better than wellbore fluids without STEELSEAL.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:
1. A method of servicing a wellbore, comprising:
providing a wellbore fluid comprising a carrier fluid and a resilient material;

introducing the wellbore fluid to an annulus;
allowing at least a portion of the wellbore fluid to become trapped in the annulus;
placing a cement composition into the annulus; and
allowing the cement composition to set, wherein at least a portion of the resilient material reduces in volume to affect the annular pressure.

2. The method of claim 1, wherein the resilient material comprises a natural rubber, an elastomeric material, a styrofoam bead, a graphite, a polymeric bead, or combinations thereof.

3. The method of claim 2, wherein the natural rubber comprises rubber materials derived from a plant, latex materials derived from a plant, or combinations thereof.

4. The method of claim 2, wherein the elastomeric material comprises a styrene-butadiene copolymer, a neoprene, a synthetic rubber, a vinyl plastisol thermoplastic, or combinations thereof.

5. The method of claim 4, wherein the synthetic rubber comprises nitrile rubber, butyl rubber, polysulfide rubber, EPDM rubber, silicone rubber, polyurethane rubber, or combinations thereof.

6. The method of claim 1, wherein the resilient material comprises a graphite.

7. The method of claim 1, wherein the wellbore fluid comprises from about 1 to about 50 vol. % resilient material.

8. The method of claim 1, wherein the carrier fluid comprises a nonaqueous-based fluid.

9. The method of claim 1, wherein the carrier fluid comprises fresh water, salt water, brine, seawater, water-based drilling fluid, or combinations thereof.

10. The method of claim 8, wherein the nonaqueous-based fluid comprises a diesel, crude oil, kerosene, aromatic mineral oil, non-aromatic mineral oil, linear alpha olefin, poly alpha olefin, internal or isomerized olefin, linear alpha benzene, ester, ether, linear paraffin, or combinations thereof.

11. The method of claim 1, wherein the wellbore fluid comprises from about 10 to about 90 vol. % carrier fluid.

12. The method of claim 1, wherein the wellbore fluid comprises a tracer, a gas-generating additive, a displacement facilitator, or combination thereof.

13. The method of claim 12, wherein the gas-generating additive comprises azodicarbonamide, aluminum powder, or combinations thereof.

14. The method of claim 1, wherein the at least a portion of the resilient material reduced in volume subsequently increases in volume.

15. The method of claim 14, wherein the at least a portion of the resilient material reduced in volume increases in volume to about a normal volume of the resilient material.

16. The method of claim 14, wherein the at least a portion of the resilient material reduced in volume increases in volume to a volume from about 70 to about 99% of a normal volume of the resilient material.

17. The method of claim 1, wherein the wellbore fluid is a spacer fluid.

18. The method of claim 1, further comprising introducing the wellbore fluid comprising the resilient material to the annulus with a drilling fluid.

19. The method of claim 1, wherein at least a portion of the wellbore fluid is trapped in the annulus after the cement composition is placed into the annulus.

* * * * *